United States Patent
Ishikawa et al.

(10) Patent No.: US 6,180,712 B1
(45) Date of Patent: Jan. 30, 2001

(54) SILICONE WATER-BASED EMULSION COMPOSITION

(75) Inventors: Hiroki Ishikawa; Tsutomu Naganawa; Isao Ona; Makoto Yoshitake, all of Chiba Prefecture (JP)

(73) Assignee: Dow Corning Silicone Co., Ltd., Tokyo (JP)

( * ) Notice: Under 35 U.S.C. 154(b), the term of this patent shall be extended for 0 days.

(21) Appl. No.: 09/384,694

(22) Filed: Aug. 27, 1999

(30) Foreign Application Priority Data

Aug. 28, 1998 (JP) .................................................. 10-242881

(51) Int. Cl.$^7$ .............................. C08K 3/36; C08G 77/26
(52) U.S. Cl. ........................... 524/588; 524/838; 528/34; 8/DIG. 1; 8/115.58; 8/115.64
(58) Field of Search ..................................... 524/838, 588; 528/34; 8/115.58, 115.64, DIG. 1

(56) References Cited

U.S. PATENT DOCUMENTS 5,936,110 * 8/1999 Yoshitake et al. .................... 556/408

FOREIGN PATENT DOCUMENTS 56-16553 of 1981 (JP) .
5-98579 of 1993 (JP) .

* cited by examiner

*Primary Examiner*—Margaret G. Moore
(74) *Attorney, Agent, or Firm*—Alex Weitz

(57) ABSTRACT

There is disclosed a silicone water-based emulsion composition suitable for treating fibers to provide a non-yellowing and adherent coating thereupon, said composition comprising:

(A) an organopolysiloxane having at least 2 silicon-bonded groups selected from hydroxyl or alkoxy groups in each molecule;
(B) a microparticulate silica;
(C) a curing catalyst; and
(D) a silatrane derivative.

20 Claims, No Drawings

SILICONE WATER-BASED EMULSION COMPOSITION

FIELD OF THE INVENTION

The invention generally relates to silicone water-based emulsion compositions. More particularly, the invention relates to a silicone water-based emulsion composition that can be converted to silicone elastomer by the removal of water with the concomitant formation of a rubber coating that is highly adherent to substrates.

BACKGROUND OF THE INVENTION

Within the art of silicone water-based emulsion compositions that form rubber coatings upon water removal, Japanese Laid Open (Kokai or Unexamined) Patent Application Number Sho 56-16553 (16,553/1981), for example, teaches a silicone emulsion composition comprising hydroxyl-functional diorganosiloxane, colloidal silica, and an organotin compound or an organoamine compound. One problem with this composition is its inadequate adherence to fabrics and textiles. Although there have been attempts to address this problem through the addition of an amino-functional organoalkoxysilane or epoxy-functional organoalkoxysilane as an adhesion promoter (refer to Japanese Laid Open (Kokai or Unexamined) Patent Application Number Hei 5-98579 (98,579/1993)), this approach can still suffer from an inadequate adherence and may cause post-treatment yellowing of fabrics and textiles.

SUMMARY OF THE INVENTION

It has now been discovered that the problems discussed above can be solved by the inclusion of a silatrane derivative in the water-based silicone composition.

The invention thus relates to a silicone water-based emulsion composition whose main components are
(A) an organopolysiloxane that contains at least 2 silicon-bonded hydroxyl or alkoxy groups in each molecule,
(B) a microparticulate silica,
(C) a curing catalyst, and
(D) a silatrane derivative having the formula

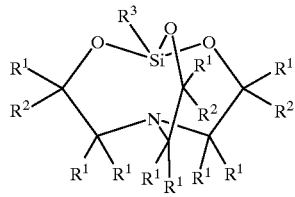

wherein each $R^1$ is independently selected from hydrogen or $C_1$ to $C_{10}$ alkyl groups, each $R^2$ is independently selected from hydrogen, $C_1$ to $C_{10}$ alkyl, or an alkoxysilyl-functional organic group with the formula $-R^4Si(OR^5)_xR^6_{(3-x)}$ in which $R^4$ is a divalent organic group, $R^5$ is $C_1$ to $C_{10}$ alkyl, $R^6$ is a monovalent organic group, and x is 1, 2, or 3 with the proviso that at least 1 of the $R^2$ groups is the above-defined alkoxysilyl-functional organic group, and $R^3$ is selected from substituted or unsubstituted monovalent hydrocarbon groups, $C_1$ to $C_{10}$ alkoxy, glycidoxyalkyl, oxiranylalkyl, acyloxyalkyl, or aminoalkyl.

The invention further relates to a method of treating one or more fibers by coating at least a portion of said fibers with the above described water-based emulsion composition.

DETAILED DESCRIPTION OF THE INVENTION

The organopolysiloxane constituting component (A) is a straight-chain or branched organopolysiloxane that contains at least 2 silicon-bonded hydroxyl or alkoxy groups in each molecule. Diorganopolysiloxane with the following general formula is a typical example of the organopolysiloxane (A) under consideration.

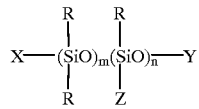

The groups R in this general formula are each independently selected from monovalent organic groups. These monovalent organic groups can be specifically exemplified by saturated aliphatic hydrocarbon groups such as methyl, ethyl, propyl, butyl, pentyl, hexyl, heptyl, octyl, decyl, and dodecyl; unsaturated aliphatic hydrocarbon groups such as vinyl, allyl, and hexenyl; saturated alicyclic hydrocarbon groups such as cyclopentyl and cyclohexyl; aromatic hydrocarbon groups such as phenyl, tolyl, and naphthyl; halogen-substituted hydrocarbon groups such as 3,3,3-trifluoropropyl, 3-chloropropyl and nonafluorobutylethyl; epoxy-functional organic groups such as 3-glycidoxypropyl and 3,4-epoxycyclohexyl; carboxyl or carboxyl derived organic groups such as $-(CH_2)_{10}COOH$, $-(CH_2)_2COOCH_3$, $-(CH_2)_{10}COOSi(CH_3)_3$ and $-CH_2CH(CH_3)COOCH_3$; amino-functional organic groups such as $-C_3H_6NHC_2H_4NH_2$, $-C_3H_6NHC_6H_{11}$ and $-C_3H_6NH_2$; and methacryl-functional organic groups such as methacryloxymethyl and 3-methacryloxypropyl. The group X is hydroxyl or alkoxy group, wherein the alkoxy can be exemplified by methoxy, ethoxy, and propoxy. The group Y is hydrogen or an alkyl group, wherein the alkyl can be exemplified by methyl, ethyl, and propyl. The group Z is $-(OSiR_2)_kX$. The subscripts n and k are both integers $\geq 0$, while the subscript m is an integer $\geq 1$. The total number average molecular weight of component (A) should be at least about 20,000, preferably 20,000 to 300,000, and the preferred ranges for the subscripts are as follows: n=integer from 0 to 100, k=integer from 0 to 100, and m=integer from 300 to 4,000. Component (A) is preferably used in emulsion form.

Organopolysiloxane (A) can be exemplified by polymers with the following structures.

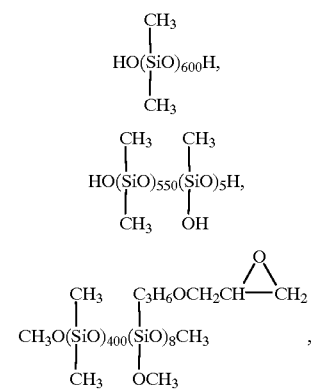

-continued

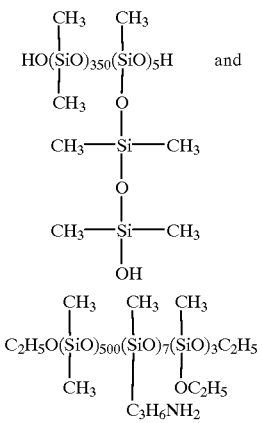

Organopolysiloxane (A) can be synthesized by known methods. For example, component (A) can be synthesized by the re-equilibration reaction of α,ω-dihydroxysiloxane oligomer or organoalkoxysilane with cyclic siloxane, e.g., octamethylcyclotetrasiloxane, in the presence of a catalyst such as alkali metal hydroxide. Component (A) can also be synthesized by known emulsion polymerization techniques, for example, by first emulsifying reactants such as cyclic siloxane and organoalkoxysilane in water using anionic or cationic surfactant and then running a polymerization reaction with the addition of an acid or base catalyst, as necessary. The organoalkoxysilane used for this emulsion polymerization will have the general formula $R_qSi(OR^5)_{4-q}$ in which R and $R^5$ are defined as above and q is 1 or 2. This organoalkoxysilane can be exemplified by dimethyldimethoxysilane, dimethyldiethoxysilane, methyltrimethoxysilane, methyltriethoxysilane, phenyltrimethoxysilane, phenyltriethoxysilane, γ-aminopropyltrimethoxysilane, γ-aminopropyltriethoxysilane, N-(β-aminoethyl)-γ-amiiiopropyltrimethoxysilane, and γ-glycidoxypropyltrimethoxysilane.

The microparticulate silica (B) functions to improve the post-cure strength of the rubber coating. Colloidal silica is highly suitable for use as component (B). This component can be used in the form of the emulsion afforded by emulsification in water using surfactant, but may also be used by first mixing it into the organopolysiloxane (A) and then dispersing the resulting mixture in water using surfactant. While the quantity of component (B) addition is not critical, component (B) is preferably added at from 0.5 to 100 weight parts per 100 weight parts (A) and more preferably at from 1 to 50 weight parts per 100 weight parts (A).

The curing catalyst (C) functions to induce crosslinking of the composition according to the present invention. This component can be specifically exemplified by the metal salts of organic acids, such as dibutyltin dilaurate, dibutyltin dioctate, dioctyltin dilaurate, dioctyltin diacetate, tin octanoate, zinc stearate, zinc octanoate, and iron octanoate; and by amine compounds such as n-hexylamine and guanidine. Except in those cases in which this component is water soluble, this curing catalyst is advantageously employed in the form of the emulsion prepared in advance by emulsification in water with the aid of surfactant. While the quantity of component (C) addition is not critical, this component is preferably added at from 0.01 to 10 weight parts per 100 weight parts (A) and more preferably at from 0.1 to 5 weight parts per 100 weight parts (A).

Component (D), which functions to improve the adherence and intimacy of contact exhibited by the composition according to the present invention, is a silatrane derivative with the following formula.

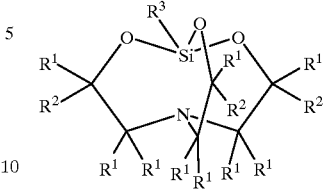

Each $R^1$ in this formula is independently selected from hydrogen or $C_1$ to $C_{10}$ alkyl. The alkyl encompassed by $R^1$ can be exemplified by methyl, ethyl, propyl, butyl, pentyl, isopropyl, isobutyl, cyclopentyl, and cyclohexyl. $R^1$ is preferably hydrogen or methyl. Each $R^2$ in the preceding general formula is independently selected from hydrogen, $C_1$ to $C_{10}$ alkyl, or alkoxysilyl-functional organic groups with the formula $—R^4Si(OR^5)_xR^6_{(3-x)}$ in which $R^4$ is a divalent organic group, $R^5$ is $C_1$ to $C_{10}$ alkyl, $R^6$ is a monovalent organic group, and x is 1, 2, or 3. For the purposes of the present invention, at least 1 of the $R^2$ groups is the above-defined alkoxysilyl-functional organic group. The alkyl encompassed by $R^2$ can be exemplified by the same alkyl groups as for $R^1$. The divalent organic group $R^4$ can be exemplified by alkylene groups such as methylene, ethylene, methylmethylene, propylene, methylethylene, butylene, hexylene, 1-methylpentylene, and 1,4-dimethylbutylene; and by alkyleneoxyalkylene groups such as methyleneoxypropylene and methylcneoxypentylene. $R^4$ is preferably ethylene, propylene, butylene, methyleneoxypropylene, or methyleneoxypentylene. The alkyl group $R^5$ can be exemplified by the same alkyl groups as for $R^1$ and preferably is methyl or ethyl. The monovalent organic group $R^6$ can be exemplified by substituted or unsubstituted monovalent hydrocarbon groups, for which specific examples are alkyl groups such as methyl, ethyl, propyl, butyl, pentyl, isopropyl, isobutyl, cyclopentyl, and cyclohexyl; aryl groups such as phenyl, tolyl, xylyl, and naphthyl; alkenyl groups such as vinyl, allyl, butenyl, pentenyl, and hexenyl; aralkyl groups such as benzyl and phenethyl; and halogenated alkyl groups such as chloromethyl, 3-chloropropyl, 3,3,3-trifluoropropyl, and nonafluorobutylethyl. Methyl is preferred for $R^6$. The following groups can be provided as examples of the alkoxysilyl-functional organic group encompassed by $R^2$.

—$(CH_2)_2Si(OCH_3)_3$,
—$(CH_2)_2Si(OCH_3)_2CH_3$,
—$(CH_2)_3Si(OC_2H_5)_3$,
—$(CH_2)_3Si(OC_2H_5)(CH_3)_2$,
—$CH_2O(CH_2)_3Si(OCH_3)_3$,
—$CH_2O(CH_2)_3Si(OC_2H_5)_3$,
—$CH_2O(CH_2)_3Si(OCH_3)_2CH_3$,
—$CH_2O(CH_2)_3Si(OC_2H_5)_2CH_3$,
—$CH_2OCH_2Si(OCH_3)_3$ and
—$CH_2OCH_2Si(OCH_3)(CH_3)_2$ $R^3$ in the preceding formula for the silatrane derivative is selected from substituted or unsubstituted monovalent hydrocarbon groups, $C_1$ to $C_{10}$ alkoxy, glycidoxyalkyl, oxiranylalkyl, acyloxyalkyl, or aminoalkyl. The monovalent hydrocarbon groups encompassed by $R^3$ can be exemplified by the monovalent hydrocarbon groups elaborated above for $R^6$. The alkoxy encompassed by $R^3$ can be exemplified by methoxy, ethoxy, and propoxy; the glycidoxyalkyl can be exemplified by 3-glycidoxypropyl; the oxiranylalkyl can be exemplified by 4-oxiranylbutyl and 8-oxiranyloctyl; the acyloxyalkyl can be exemplified by acetoxypropyl and 3-methacryloxypropyl; and the aminoalkyl can be exemplified by 3-aminopropyl and N-(2-aminoethyl)-3-aminopropyl. Except wherein this component is water-soluble, the subject silatrane derivative is preferably preliminarily converted into emulsion form by emulsification in water using surfactant. The quantity of component (D) addition is not critical, but this component is preferably used at from 0.01 to 10 weight parts per 100 weight parts (A) and more preferably at from 0.1 to 5 weight parts per 100 weight parts (A). The subject silatrane derivative can be synthesized, for example, by reacting an amine compound with general formula $NH_y(CR^1_2CR^1R^2OH)_{3-y}$ with an epoxy-functional trialkoxysilane with the general formula

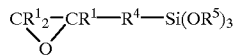

in which y=1 or 2 and $R^1$, $R^2$, $R^4$, and $R^5$ are defined as above.

The silatrane derivative under consideration can be exemplified by the following compounds.

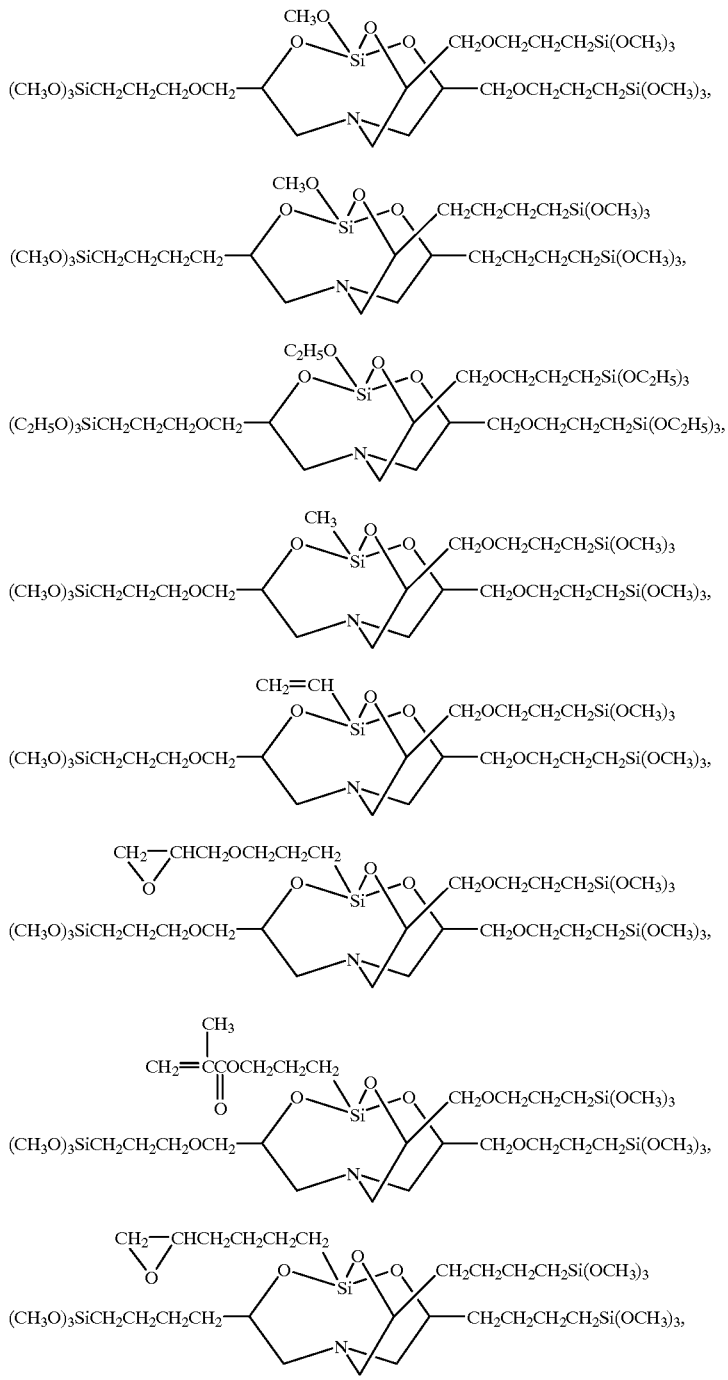

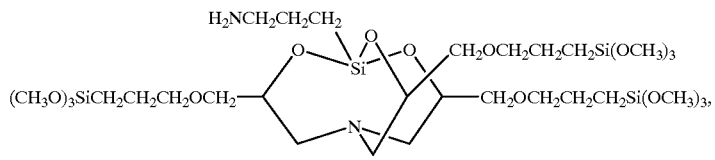
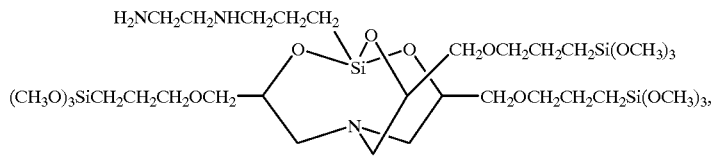
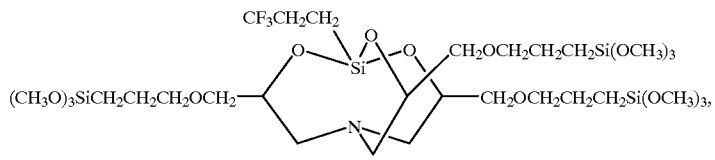
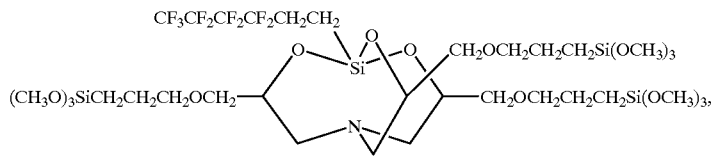
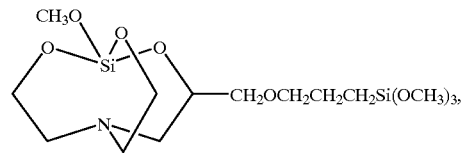
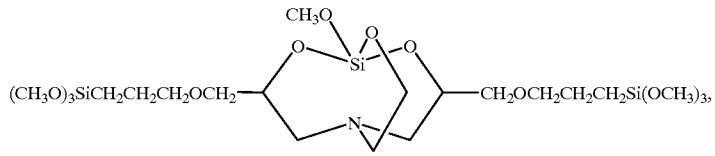
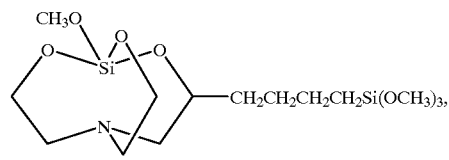
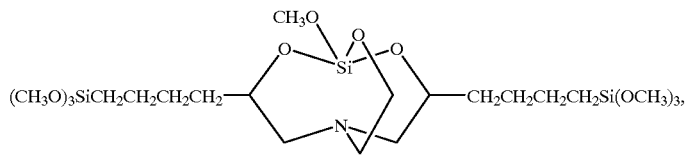
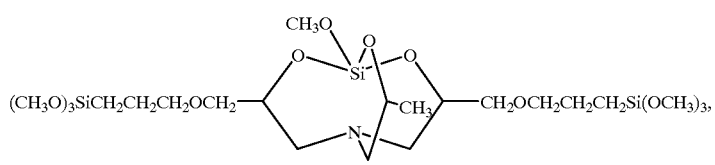

-continued
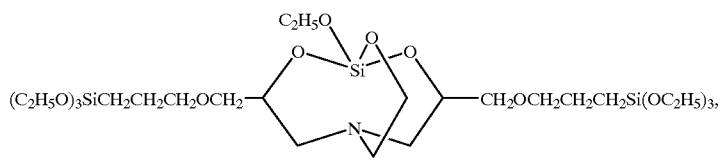
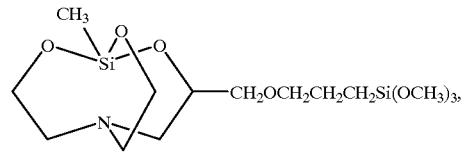
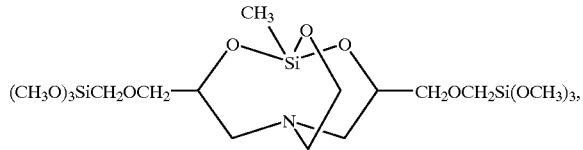
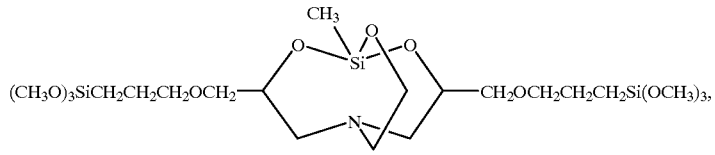
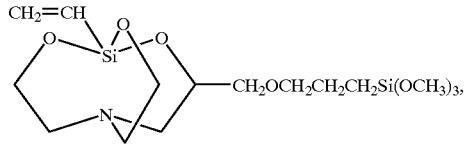
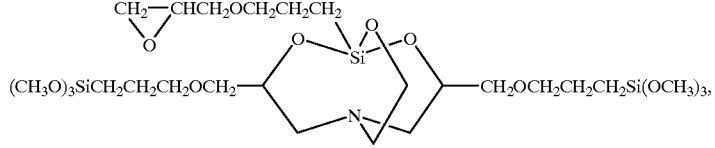
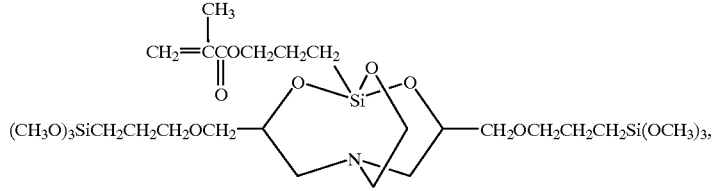
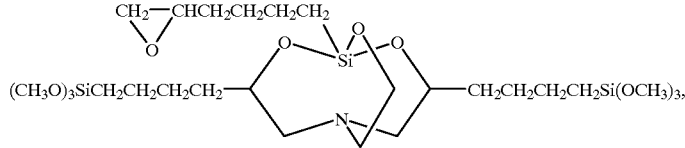
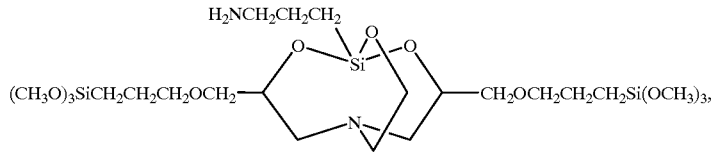
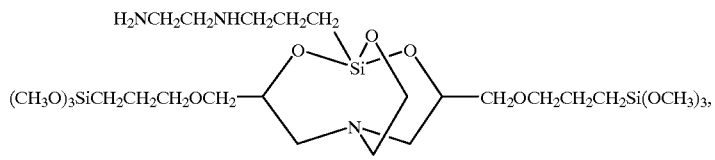

-continued

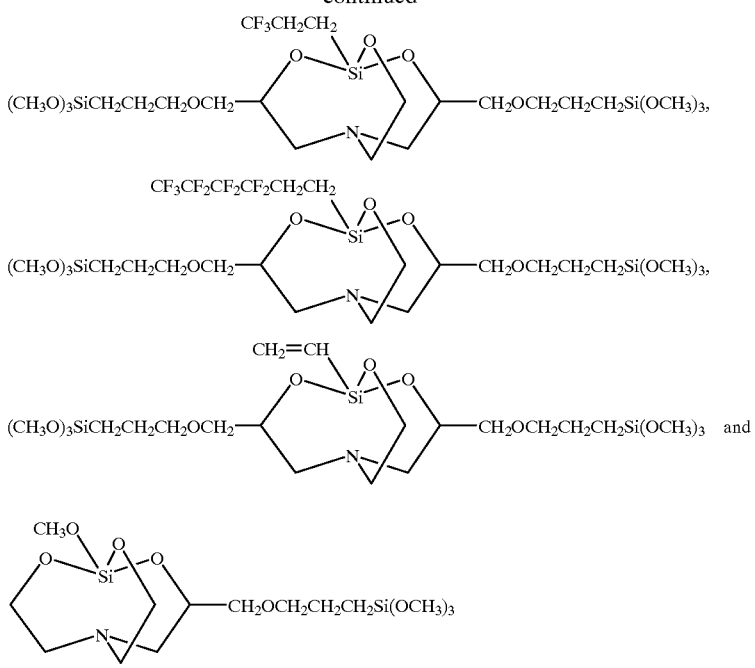

There are no particular restrictions on the surfactants used to emulsify the various components discussed hereinabove. Surfactants usable for this purpose can be exemplified by anionic surfactants such as alkyl sulfate salts, alkylbenzenesulfonate salts, and alkyl phosphate salts; nonionic surfactants such as polyoxyalkylene alkyl ethers, polyoxyethylene alkylphenyl ethers, polyoxyethylene fatty acid esters, and sorbitan fatty acid esters; cationic surfactants such as quaternary ammonium salts and the alkylamine salts of acetic acid; and amphoteric surfactants such as alkylbetaines and alkylimidazolines.

For the pruposes of the present invention, it is preferred that components (A) through (D) consititute from 0.5 to about 70 weight percent of the water-based emulsion composition, the remainder being predominantly water.

The silicone water-based emulsion composition according to the present invention may be blended with a wide variety of other components on an optional basis, such as thickeners, antifoams/defoamers, penetrants, antistatics, inorganic powders, preservatives, and silane coupling agents.

The instant emulsion compositions find utility as an agent for treating (coating) a fiber or fibers. The latter can be exemplified by natural fibers such as hair, wool, silk, flax, hemp, angora, mohair, and asbestos; regenerated fibers such as rayon and bemberg; semisynthetic fibers such as acetate; synthetic fibers such as the fibers of nylon, polyester, polyamide, polyacrylonitrile, polyvinyl chloride, vinylon, polyethylene, polypropylene, and spandex; and inorganic fibers such as glass fiber, carbon fiber, and silicon carbide fiber. These fibers can take the form, for example, of knits, weaves, nonwovens, papers, and webs.

EXAMPLES

The invention will be explained in greater detail below using working examples, in which parts denotes weight parts. The cured rubber coatings afforded by the silicone water-based emulsion compositions were evaluated for adherence and presence/absence of yellowing using the following methods.

Adherence

After the rubber coating had been formed on a nylon 66 fabric, adherence was evaluated by vigorously rubbing the fabric with the fingers (a poorly adherent rubber coating would debond and shed under these conditions). The performance was evaluated on the following 3-level scale:

++ the adherence was excellent, no shedding of the rubber coating occurred
+ slight shedding and debonding of the rubber coating occurred
x shedding of the rubber coating occurred Presence/absence of yellowing The silicone water-based emulsion composition was coated on nylon 66 fabric and the fabric was subsequently heated for 10 minutes in a 130° C. oven. The coated fabric was then evaluated for color change.

Reference Example 1

Preparation of component (A)

Ten parts of dodecylbenzenesulfonic acid was dissolved in 484.6 parts of water. A separately prepared mixture of 500 parts octamethylcyclotetrasiloxane and 5.4 parts of phenyltriethoxysilane was then added to the surfactant solution with stirring. The resulting mixture was passed twice through an homogenizer emulsifier at 400 kg/cm$^2$ to give an emulsion. The resulting emulsion was heated for 2 hours at 80° C., held overnight at 25° C. and was thereafter neutralized with 10% aqueous sodium carbonate solution to TSL 1456 24 give an emulsion A for use as component (A). Analysis of the organopolysiloxane in this emulsion by IR and NMR confirmed it to be siloxane with the following average formula.

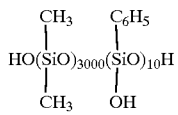

Reference Example 2

Preparation of component (C)

Thirty parts of dioctyltin dilaurate and 5 parts polyoxyethylene nonylphenyl ether ($C_9H_{19}C_6H_5$—O—$(C_2H_4O)_{10}H$) were mixed to uniformity using a homomixer followed by the gradual addition of 65 parts water with emulsification and dispersion in the water. The resulting mixture was passed twice through an homogenizer emulsifier at 300 kg/cm² to yield an emulsion C for use as component (C).

Reference Example 3

Preparation of component (D)

A 500 ml flash was charged with 12.2 g of 2-hydroxyethylamine, 81.7 g of methyltrimethoxysilane, 94.5 g of 3-glycidoxypropyltrimethoxysilane, and 32.0 g of methanol and the mixture heated with stirring for 8 hours at the methanol reflux temperature. The low boilers were then distilled off to yield silatrane D. Analysis of silatrane D by $^{29}$Si-NMR and $^{13}$C-NMR confirmed it to have the following structure.

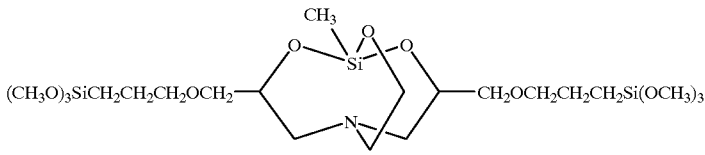

Example 1

Twenty parts of a colloidal silica (Snowtex™ 30 from Nissan Chemical Industries, Ltd., 30)% effective component) was added with stirring to 70 parts of the emulsion A prepared in Reference Example 1. This was followed by the addition of 1 part of the emulsion C prepared in Reference Example 2 and then by the addition of 0.5 part of the silatrane D prepared in Reference Example 3 to afford a silicone water-based emulsion composition. Using an applicator, this silicone water-based emulsion composition was coated on a nylon 66 fabric (420D) so as to provide a post-drying film thickness of 3 μm. The coated fabric was dried at room temperature overnight to yield a rubber coating. This rubber coating was evaluated for adherence and presence/absence of yellowing as described above, and the obtained results are reported in Table 1.

Comparative Examples 1 to 3

Silicone water-based emulsion compositions were prepared as in Example 1, but with the following modifications: silatrane D was not added in Comparative Example 1, the aminosilane $NH_2C_2H_4NHC_3H_6Si(OCH_3)_3$ was added in place of silatrane D in Comparative Example 2, and the epoxysilane

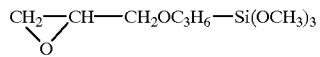

was used in place of silatrane D in Comparative Example 3. The resulting silicone water-based emulsion compositions were cured as in Example 1, and the resulting rubber coatings were evaluated for adherence and presence/absence of yellowing as described above. The obtained results are reported in Table 1.

TABLE 1

|  | Example 1 | Comparative Example 1 | Comparative Example 2 | Comparative Example 3 |
| --- | --- | --- | --- | --- |
| emulsion A | 70 | 70 | 70 | 70 |
| colloidal silica | 20 | 20 | 20 | 20 |
| emulsion C | 1 | 1 | 1 | 1 |
| silatrane D | 0.5 | — | — | — |
| aminosilane | — | — | 0.5 | — |
| epoxysilane | — | — | — | 0.5 |
| adherence | ++ | + | ++ | + |
| yellowing | none | none | present | none |
| overall evaluation | ideal | unsuitable due to inadequate adherence | unsuitable due to yellowing | unsuitable due to inadequate adherence |

That which is claimed is:

1. A silicone water-based emulsion composition comprising:

(A) 100 parts by weight of an organopolysiloxane having at least 2 silicon-bonded groups selected from hydroxyl or alkoxy groups in each molecule;

(B) 0.5 to 100 parts by weight of a microparticulate silica;

(C) 0.01 to 10 parts by weight of a curing catalyst; and (D) 0.01 to 10 parts by weight of a silatrane derivative having the formula

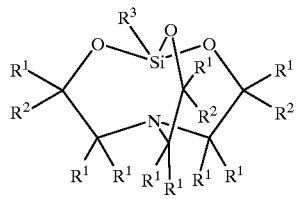

wherein each $R^1$ is independently selected from hydrogen or $C_1$ to $C_{10}$ alkyl groups, each $R^2$ is independently selected from hydrogen, $C_1$ to $C_{10}$ alkyl or alkoxysilyl-functional organic groups of the formula —$R^4Si(OR^5)_xR^6_{(3-x)}$ in which $R^4$ is a divalent organic group, $R^5$ is $C_1$ to $C_{10}$ alkyl, $R^6$ is a monovalent organic group and x is 1, 2, or 3, with the proviso that at least one of the $R^2$ groups is the above-defined alkoxysilyl-functional organic group, and $R^3$ is selected from substituted or substituted monovalent hydrocarbon groups, $C_1$ to $C_{10}$ alkoxy, glycidoxyalkyl, oxiranylalkyl, acyloxyalkyl or aminoalkyl.

2. The composition according to claim 1, wherein said organopolysiloxane has the formula

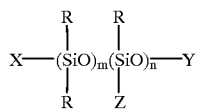

in which each R is independently selected from monovalent organic groups, X is selected from hydroxyl or alkoxy, Y is hydrogen or alkyl, Z is —$(OSiR_2)_k X$, n and k are integers having a value of $\geq 0$ and m is an integer having a value of $\geq 1$.

3. The composition according to claim 2, wherein R is methyl and said organopolysiloxane has a number average molecular weight of 20,000 to 300,000.

4. The composition according to claim 3, wherein said microparticulate silica is colloidal silica.

5. The composition according to claim 2, wherein said microparticulate silica is colloidal silica.

6. The composition according to claim 2, wherein $R^4$ is selected from ethylene, propylene, butylene, methyleneoxypropylene, or methyleneoxypentylene, $R^5$ is selected from methyl or ethyl and $R^6$ is methyl.

7. The composition according to claim 6, wherein R is methyl and said organopolysiloxane has a number average molecular weight of 20,000 to 300,000.

8. The composition according to claim 7, wherein said microparticulate silica is colloidal silica.

9. The composition according to claim 2, wherein 1 to 50 parts by weight of said microparticulate silica, 0.1 to 5 parts by weight of said curing catalyst and 0.1 to 5 parts by weight of said silatrane derivative are used for each 100 parts by weight of said organopolysiloxane.

10. The composition according to claim 8, wherein 1 to 50 parts by weight of said microparticulate silica, 0.1 to 5 parts by weight of said curing catalyst and 0.1 to 5 parts by weight of said silatrane derivative are used for each 100 parts by weight of said organopolysiloxane.

11. A method for treating a fiber comprising coating at least a portion of said fiber with the composition according to claim 1.

12. A method for treating a fiber comprising coating at least a portion of said fiber with the composition according to claim 2.

13. A method for treating a fiber comprising coating it least a portion of said fiber with the composition according to claim 3.

14. A method for treating a fiber comprising coating at least a portion of said fiber with the composition according to claim 4.

15. A method for treating a fiber comprising coating at least a portion of said fiber with the composition according to claim 5.

16. A method for treating a fiber comprising coating at least a portion of said fiber with the composition according to claim 6.

17. A method for treating a fiber comprising coating at least a portion of said fiber with the composition according to claim 7.

18. A method for treating a fiber comprising coating at least a portion of said fiber with the composition according to claim 8.

19. A method for treating a fiber comprising coating at least a portion of said fiber with the composition according to claim 9.

20. A method for treating a fiber comprising coating at least a portion of said fiber with the composition according to claim 10.

* * * * *